(12) United States Patent
Botura et al.

(10) Patent No.: US 8,260,522 B2
(45) Date of Patent: Sep. 4, 2012

(54) AIRCRAFT ELECTRICAL POWER SYSTEM

(75) Inventors: Galdemir C. Botura, North Canton, OH (US); Richard J. Cole, Stow, OH (US); James M. Roman, Uniontown, OH (US)

(73) Assignee: Goodrich Corporation, Charlotte, NC (US)

( * ) Notice: Subject to any disclaimer, the term of this patent is extended or adjusted under 35 U.S.C. 154(b) by 127 days.

(21) Appl. No.: 12/702,685

(22) Filed: Feb. 9, 2010

(65) Prior Publication Data

US 2010/0204848 A1    Aug. 12, 2010

Related U.S. Application Data

(60) Provisional application No. 61/151,202, filed on Feb. 10, 2009.

(51) Int. Cl.
*G06F 19/00* (2006.01)

(52) U.S. Cl. .............. 701/99; 701/22; 307/9.1; 307/22; 307/29; 307/31; 307/32; 180/65.8; 700/295

(58) Field of Classification Search .................. 701/22, 701/99, 200, 201; 180/65.8; 307/9.1, 22, 307/29, 31, 32, 43, 44, 84; 700/295; 707/706, 707/722, 999.006, 999.003, E17.014, E17.018; 1/1; 709/217; 715/217, 757; 455/414.1, 455/414.2, 422.1, 456.1, 456.3
See application file for complete search history.

(56) References Cited

U.S. PATENT DOCUMENTS

| | | | | |
|---|---|---|---|---|
| 4,523,517 | A * | 6/1985 | Cronin | ............................ 454/74 |
| 5,823,468 | A * | 10/1998 | Bothe | ............................... 244/2 |
| 6,124,646 | A * | 9/2000 | Artinian et al. | .................. 290/52 |
| 6,921,987 | B2 | 7/2005 | Martin-Martinod | |
| 7,400,065 | B2 | 7/2008 | Michalko | |
| 7,406,370 | B2 | 7/2008 | Kojori et al. | |
| 7,564,147 | B2 | 7/2009 | Michalko | |
| 7,656,637 | B2 | 2/2010 | McAvoy et al. | |
| 2008/0058998 | A1 | 3/2008 | Breit | |
| 2008/0152494 | A1 | 6/2008 | Froman | |
| 2008/0238201 | A1 | 10/2008 | Oliver et al. | |
| 2009/0103221 | A1 | 4/2009 | Aronson et al. | |
| 2009/0152942 | A1 | 6/2009 | Waite et al. | |
| 2009/0295314 | A1 | 12/2009 | Ganev et al. | |
| 2010/0133907 | A1 * | 6/2010 | Galasso | ........................... 307/39 |

* cited by examiner

*Primary Examiner* — James Trammell
*Assistant Examiner* — McDieunel Marc
(74) *Attorney, Agent, or Firm* — Cindy Murphy LLC

(57) ABSTRACT

An aircraft electric power supply system (10) for supplying electric power to onboard electric devices (20) during flight. To reduce the devices' power draw, the electric power is supplied via modulation at an increment-percentage that is determined by present conditions. An optimum portfolio can be established for the electrical devices (20) collectively, this portfolio being selected in accordance with an energy-management criterion or other aircraft objectives.

19 Claims, 19 Drawing Sheets

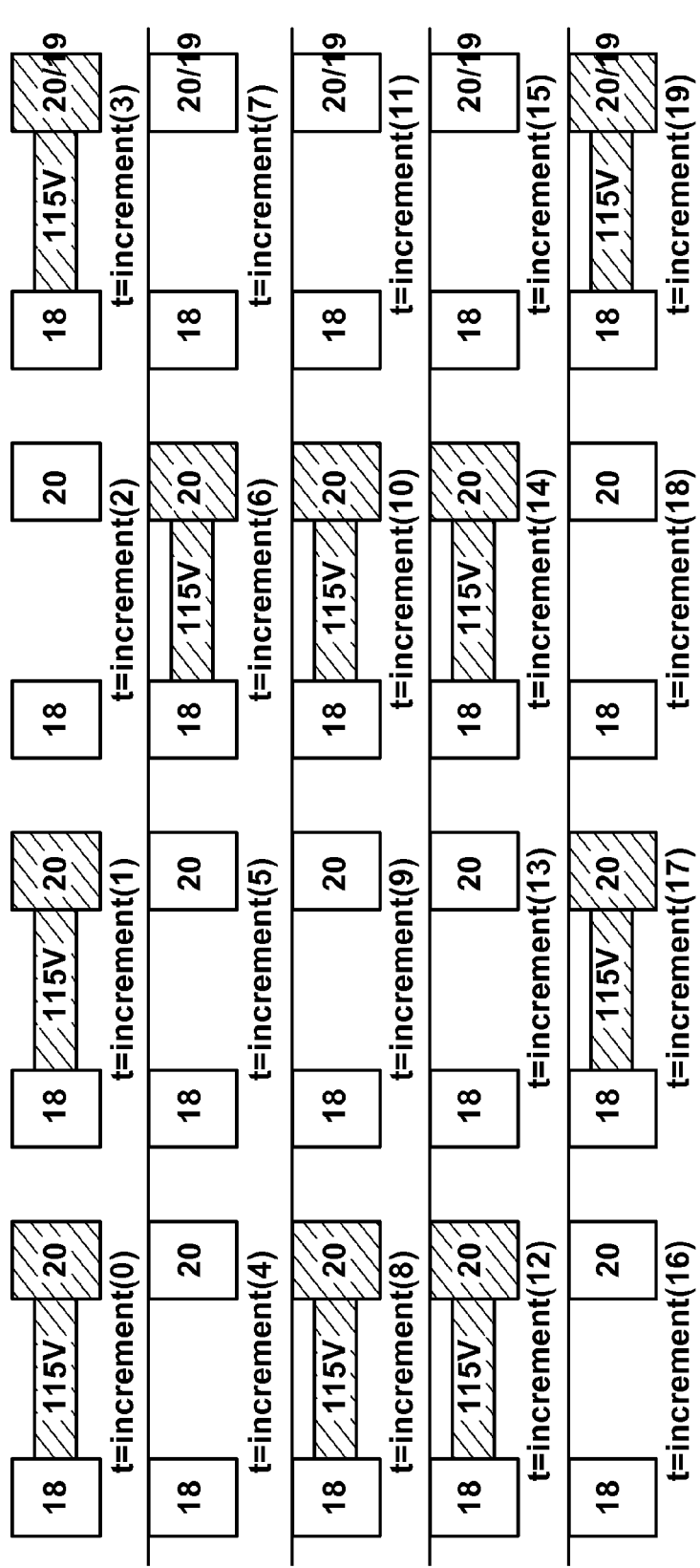
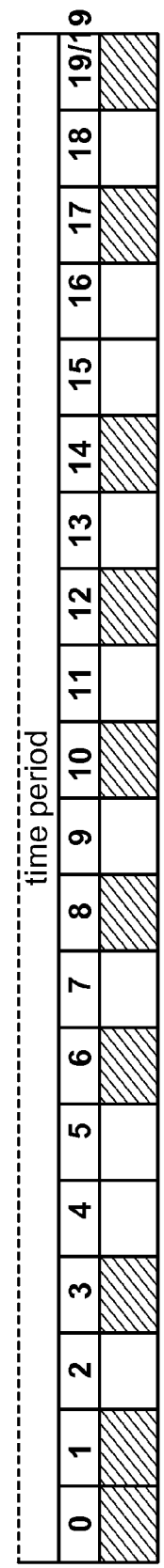
FIGURE 3A
FIGURE 3B

FIGURE 6A

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 20a | 0 | 0 | 0 | 0 | 0 | 0 | 0 | 0 | 0 | 0 | 0 | 0 | 0 | 0 | 0 | 0 | 0 | 0 | 0 | 0 |
| 20b | 0 | 0 | 0 | 0 | 0 | 0 | 0 | 0 | 0 | 0 | 0 | 0 | 0 | 0 | 0 | 0 | 0 | 0 | 0 | 0 |
| 20c | 0 | 0 | 0 | 0 | 0 | 0 | 0 | 0 | 0 | 0 | 0 | 0 | 0 | 0 | 0 | 0 | 0 | 0 | 0 | 0 |
| 20d | 0 | 0 | 0 | 0 | 0 | 0 | 0 | 0 | 0 | 0 | 0 | 0 | 0 | 0 | 0 | 0 | 0 | 0 | 0 | 0 |
| Total | 0 | 0 | 0 | 0 | 0 | 0 | 0 | 0 | 0 | 0 | 0 | 0 | 0 | 0 | 0 | 0 | 0 | 0 | 0 | 0 |

FIGURE 6B

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 20a | 12 | 12 | 12 | 12 | 12 | 12 | 12 | 12 | 12 | 12 | 12 | 12 | 12 | 12 | 12 | 0 | 0 | 0 | 0 | 0 |
| 20b | 0 | 0 | 0 | 0 | 0 | 0 | 0 | 0 | 0 | 0 | 0 | 0 | 0 | 0 | 0 | 0 | 0 | 0 | 0 | 0 |
| 20c | 0 | 0 | 0 | 0 | 0 | 0 | 0 | 0 | 0 | 0 | 0 | 0 | 0 | 0 | 0 | 0 | 0 | 0 | 0 | 0 |
| 20d | 0 | 0 | 0 | 0 | 0 | 0 | 0 | 0 | 0 | 0 | 0 | 0 | 0 | 0 | 0 | 0 | 0 | 0 | 0 | 0 |
| Total | 12 | 12 | 12 | 12 | 12 | 12 | 12 | 12 | 12 | 12 | 12 | 12 | 12 | 12 | 12 | 0 | 0 | 0 | 0 | 0 |

FIGURE 6C

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 20a | 0 | 0 | 0 | 0 | 0 | 12 | 12 | 12 | 12 | 12 | 12 | 12 | 12 | 12 | 12 | 12 | 12 | 12 | 12 | 12 |
| 20b | 0 | 0 | 0 | 0 | 0 | 0 | 0 | 0 | 0 | 0 | 0 | 0 | 0 | 0 | 0 | 0 | 0 | 0 | 0 | 0 |
| 20c | 0 | 0 | 0 | 0 | 0 | 0 | 0 | 0 | 0 | 0 | 0 | 0 | 0 | 0 | 0 | 0 | 0 | 0 | 0 | 0 |
| 20d | 0 | 0 | 0 | 0 | 0 | 0 | 0 | 0 | 0 | 0 | 0 | 0 | 0 | 0 | 0 | 0 | 0 | 0 | 0 | 0 |
| Total | 0 | 0 | 0 | 0 | 0 | 12 | 12 | 12 | 12 | 12 | 12 | 12 | 12 | 12 | 12 | 12 | 12 | 12 | 12 | 12 |

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 20a | 0 | 0 | 0 | 0 | 0 | 0 | 12 | 12 | 12 | 12 | 12 | 12 | 12 | 12 | 12 | 12 | 12 | 12 | 12 | 12 |
| 20b | 10 | 10 | 10 | 10 | 10 | 10 | 10 | 10 | 10 | 10 | 0 | 0 | 0 | 0 | 0 | 0 | 0 | 0 | 0 | 0 |
| 20c | 0 | 0 | 0 | 0 | 0 | 0 | 0 | 0 | 0 | 0 | 0 | 0 | 0 | 0 | 0 | 0 | 0 | 0 | 0 | 0 |
| 20d | 0 | 0 | 0 | 0 | 0 | 0 | 0 | 0 | 0 | 0 | 0 | 0 | 0 | 0 | 0 | 0 | 0 | 0 | 0 | 0 |
| Total | 10 | 10 | 10 | 10 | 10 | 10 | 22 | 22 | 22 | 22 | 12 | 12 | 12 | 12 | 12 | 12 | 12 | 12 | 12 | 12 |

FIGURE 6D

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 20a | 0 | 0 | 0 | 0 | 0 | 12 | 12 | 12 | 12 | 12 | 12 | 12 | 12 | 12 | 12 | 12 | 12 | 12 | 12 | 12 |
| 20b | 10 | 10 | 10 | 10 | 10 | 0 | 0 | 0 | 0 | 0 | 0 | 0 | 0 | 0 | 0 | 10 | 10 | 10 | 10 | 10 |
| 20c | 0 | 0 | 0 | 0 | 0 | 0 | 0 | 0 | 0 | 0 | 0 | 0 | 0 | 0 | 0 | 0 | 0 | 0 | 0 | 0 |
| 20d | 0 | 0 | 0 | 0 | 0 | 0 | 0 | 0 | 0 | 0 | 0 | 0 | 0 | 0 | 0 | 0 | 0 | 0 | 0 | 0 |
| Total | 10 | 10 | 10 | 10 | 10 | 12 | 12 | 12 | 12 | 12 | 12 | 12 | 12 | 12 | 12 | 22 | 22 | 22 | 22 | 22 |

FIGURE 6E

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 20a | 0 | 0 | 0 | 0 | 0 | 12 | 12 | 12 | 12 | 12 | 12 | 12 | 12 | 12 | 12 | 12 | 12 | 12 | 12 | 12 |
| 20b | 10 | 10 | 10 | 10 | 10 | 0 | 0 | 0 | 0 | 0 | 0 | 0 | 0 | 0 | 0 | 10 | 10 | 10 | 10 | 10 |
| 20c | 8 | 8 | 8 | 8 | 8 | 0 | 0 | 0 | 0 | 0 | 0 | 0 | 0 | 0 | 0 | 0 | 0 | 0 | 0 | 0 |
| 20d | 0 | 0 | 0 | 0 | 0 | 0 | 0 | 0 | 0 | 0 | 0 | 0 | 0 | 0 | 0 | 0 | 0 | 0 | 0 | 0 |
| Total | 18 | 18 | 18 | 18 | 18 | 12 | 12 | 12 | 12 | 12 | 12 | 12 | 12 | 12 | 12 | 22 | 22 | 22 | 22 | 22 |

FIGURE 6F

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 20a | 12 | 12 | 12 | 12 | 12 | 12 | 12 | 12 | 12 | 12 | 0 | 0 | 0 | 0 | 0 | 12 | 12 | 12 | 12 | 12 |
| 20b | 0 | 0 | 0 | 0 | 0 | 0 | 0 | 0 | 0 | 0 | 10 | 10 | 10 | 10 | 10 | 10 | 10 | 10 | 10 | 10 |
| 20c | 0 | 0 | 0 | 0 | 0 | 0 | 0 | 0 | 0 | 0 | 8 | 8 | 8 | 8 | 8 | 0 | 0 | 0 | 0 | 0 |
| 20d | 0 | 0 | 0 | 0 | 0 | 0 | 0 | 0 | 0 | 0 | 0 | 0 | 0 | 0 | 0 | 0 | 0 | 0 | 0 | 0 |
| Total | 12 | 12 | 12 | 12 | 12 | 12 | 12 | 12 | 12 | 12 | 18 | 18 | 18 | 18 | 18 | 22 | 22 | 22 | 22 | 22 |

FIGURE 6G

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 20a | 12 | 12 | 12 | 12 | 12 | 12 | 12 | 12 | 12 | 12 | 0 | 0 | 0 | 0 | 0 | 12 | 12 | 12 | 12 | 12 |
| 20b | 0 | 0 | 0 | 0 | 0 | 0 | 0 | 0 | 0 | 0 | 10 | 10 | 10 | 10 | 10 | 10 | 10 | 10 | 10 | 10 |
| 20c | 0 | 0 | 0 | 0 | 0 | 0 | 0 | 0 | 0 | 0 | 8 | 8 | 8 | 8 | 8 | 0 | 0 | 0 | 0 | 0 |
| 20d | 8 | 8 | 8 | 8 | 8 | 8 | 8 | 8 | 8 | 8 | 8 | 8 | 8 | 8 | 8 | 0 | 0 | 0 | 0 | 0 |
| Total | 20 | 20 | 20 | 20 | 20 | 20 | 20 | 20 | 20 | 20 | 26 | 26 | 26 | 26 | 26 | 22 | 22 | 22 | 22 | 22 |

FIGURE 6H

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 20a | 12 | 12 | 12 | 12 | 12 | 12 | 12 | 12 | 12 | 12 | 12 | 12 | 12 | 12 | 12 | 0 | 0 | 0 | 0 | 0 |
| 20b | 0 | 0 | 0 | 0 | 0 | 0 | 0 | 0 | 0 | 0 | 10 | 10 | 10 | 10 | 10 | 10 | 10 | 10 | 10 | 10 |
| 20c | 0 | 0 | 0 | 0 | 0 | 0 | 0 | 0 | 0 | 0 | 0 | 0 | 0 | 0 | 0 | 8 | 8 | 8 | 8 | 8 |
| 20d | 8 | 8 | 8 | 8 | 8 | 8 | 8 | 8 | 8 | 8 | 0 | 0 | 0 | 0 | 0 | 8 | 8 | 8 | 8 | 8 |
| Total | 20 | 20 | 20 | 20 | 20 | 20 | 20 | 20 | 20 | 20 | 22 | 22 | 22 | 22 | 22 | 26 | 26 | 26 | 26 | 26 |

|       | 1  | 3  | 5  | 7  | 9  | 11 | 13 | 15 | 17 | 19 |
|-------|----|----|----|----|----|----|----|----|----|----|
| 20a   | 12 | 12 | 12 | 12 | 12 | 12 | 12 | 12 | 0  | 0  |
| 20b   | 0  | 0  | 0  | 0  | 0  | 10 | 10 | 10 | 10 | 10 |
| 20c   | 0  | 0  | 0  | 0  | 0  | 0  | 0  | 0  | 8  | 8  |
| 20d   | 8  | 8  | 8  | 8  | 8  | 0  | 0  | 0  | 8  | 8  |
| Total | 20 | 20 | 20 | 20 | 20 | 22 | 22 | 22 | 26 | 26 |

FIGURE 6K

|       | 2  | 4  | 6  | 8  | 10 | 12 | 14 | 16 | 18 | 20 |
|-------|----|----|----|----|----|----|----|----|----|----|
| 20a   | 12 | 12 | 12 | 12 | 12 | 12 | 12 | 0  | 0  | 0  |
| 20b   | 0  | 0  | 0  | 0  | 0  | 10 | 10 | 10 | 10 | 10 |
| 20c   | 0  | 0  | 0  | 0  | 0  | 0  | 0  | 8  | 8  | 8  |
| 20d   | 8  | 8  | 8  | 8  | 8  | 0  | 0  | 8  | 8  | 8  |
| Total | 20 | 20 | 20 | 20 | 20 | 22 | 22 | 26 | 26 | 26 |

FIGURE 6L

|       | 20 | 18 | 16 | 14 | 12 | 10 | 8  | 6  | 4  | 2  |
|-------|----|----|----|----|----|----|----|----|----|----|
| 20a   | 0  | 0  | 0  | 12 | 12 | 12 | 12 | 12 | 12 | 12 |
| 20b   | 10 | 10 | 10 | 0  | 0  | 0  | 0  | 0  | 0  | 0  |
| 20c   | 8  | 8  | 8  | 0  | 0  | 0  | 0  | 0  | 0  | 0  |
| 20d   | 8  | 8  | 8  | 8  | 8  | 8  | 8  | 8  | 8  | 8  |
| Total | 26 | 26 | 26 | 20 | 20 | 20 | 20 | 20 | 20 | 20 |

FIGURE 6M

| | 1 | 3 | 5 | 7 | 9 | 11 | 13 | 15 | 17 | 19 | 20 | 18 | 16 | 14 | 12 | 10 | 8 | 6 | 4 | 2 |
|---|---|---|---|---|---|---|---|---|---|---|---|---|---|---|---|---|---|---|---|---|
| 20a | 12 | 12 | 12 | 12 | 12 | 12 | 12 | 12 | 0 | 0 | 0 | 0 | 0 | 12 | 12 | 12 | 12 | 12 | 12 | 12 |
| 20b | 0 | 0 | 0 | 0 | 0 | 10 | 10 | 10 | 10 | 10 | 10 | 10 | 10 | 10 | 10 | 0 | 0 | 0 | 0 | 0 |
| 20c | 0 | 0 | 0 | 0 | 0 | 0 | 0 | 0 | 8 | 8 | 8 | 8 | 8 | 0 | 0 | 0 | 0 | 0 | 0 | 0 |
| 20d | 8 | 8 | 8 | 8 | 8 | 0 | 0 | 0 | 8 | 8 | 8 | 8 | 8 | 0 | 0 | 8 | 8 | 8 | 8 | 8 |
| Total | 20 | 20 | 20 | 20 | 20 | 22 | 22 | 22 | 26 | 26 | 26 | 26 | 26 | 22 | 22 | 20 | 20 | 20 | 20 | 20 |

AIRCRAFT ELECTRICAL POWER SYSTEM

RELATED APPLICATION

This application claims priority under 35 U.S.C. §119(e) to U.S. Provisional Patent Application No. 61/151,202 filed on Feb. 10, 2009. The entire disclosure of this application is hereby incorporated by reference. To the extent that inconsistencies exist between the present application and any incorporated applications, the present application governs interpretation to the extent necessary to avoid indefiniteness and/or clarity issues.

BACKGROUND

An aircraft will typically contain an electrical power system for providing electrical power to its onboard electric devices during flight. For example, an aircraft can have an electrical generator that is rotated by its engine to produce electrical power. Onboard electrical devices (e.g., electrothermal ice protection units) are accordingly adapted to operate when supplied with electric power from this power source during flight.

SUMMARY

An aircraft's electrical devices are each supplied electrical power in a modulated manner such that, for each increment, electrical power is either supplied to the respective electric device or it is not. An equivalent "average" power is created by such modulation, without having to directly reduce voltage to the electrical device (which is often not practical). It has been found that many electrical devices (e.g., ice protection units) can adequately perform in most flight conditions with well under their conventional 100% power draws.

Such a modulated electric power supply not only reduces overall power consumption, but also enhances energy management. For each electrical device and its given on-off increment percentage, many different increment distribution patterns will be suitable. The different (suitable) patterns for all of the devices can be arrayed into a multitude of unique combinations, from which an optimum pattern portfolio can be selected to meet a particular objective. For example, the optimum pattern portfolio can minimize the devices' collective power draw during each increment and/or it can minimize increment-to-increment variation.

DRAWINGS

FIGS. 3A-3E are diagrams relating to electric-supply increments and the distribution patterns corresponding thereto.

FIGS. 6A-6M are tables schematically showing a power-management algorithm.

DESCRIPTION

Figure 1:
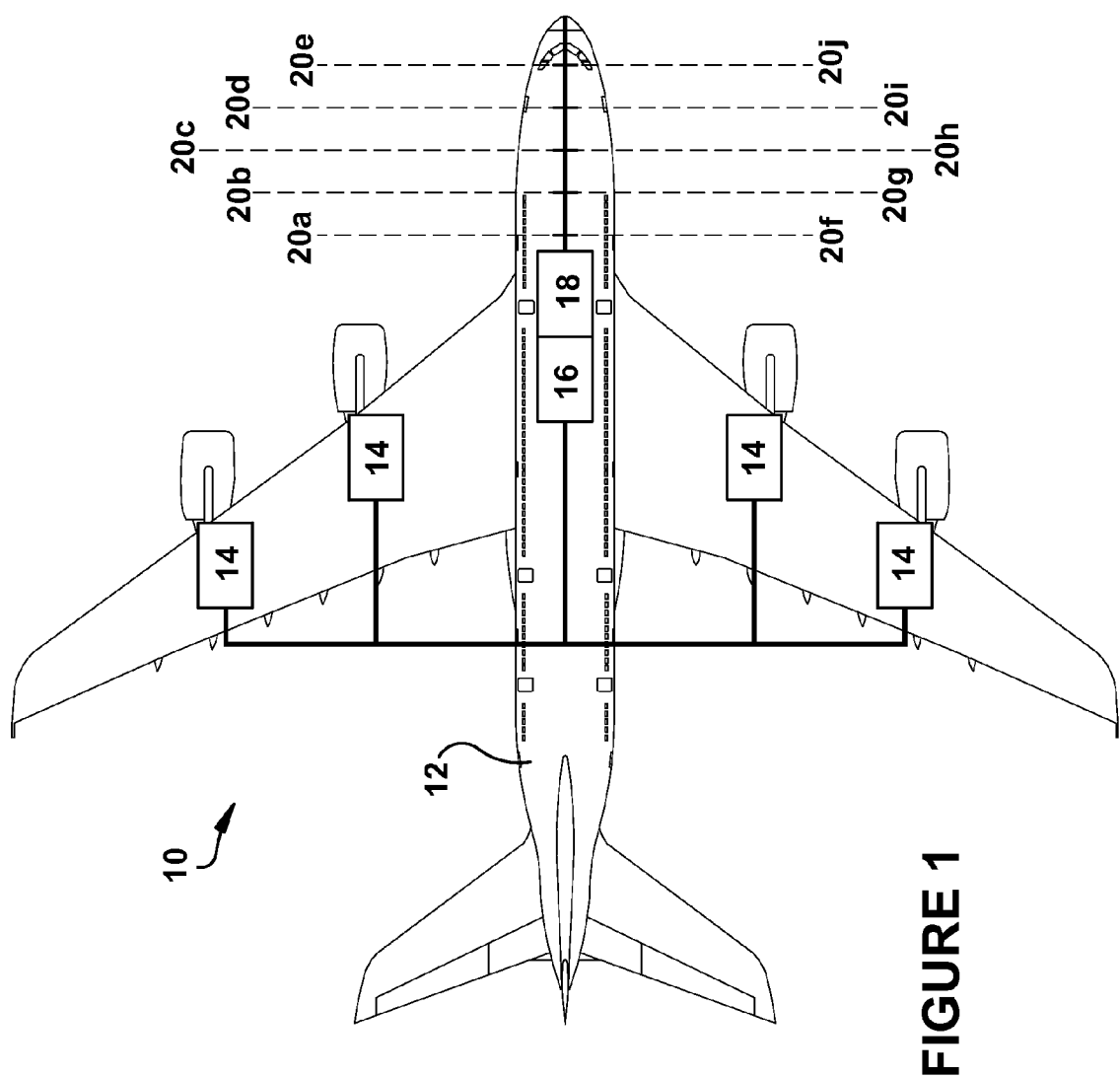
FIG. 1 is a diagram of an aircraft and its electric power system.
Figure 2:
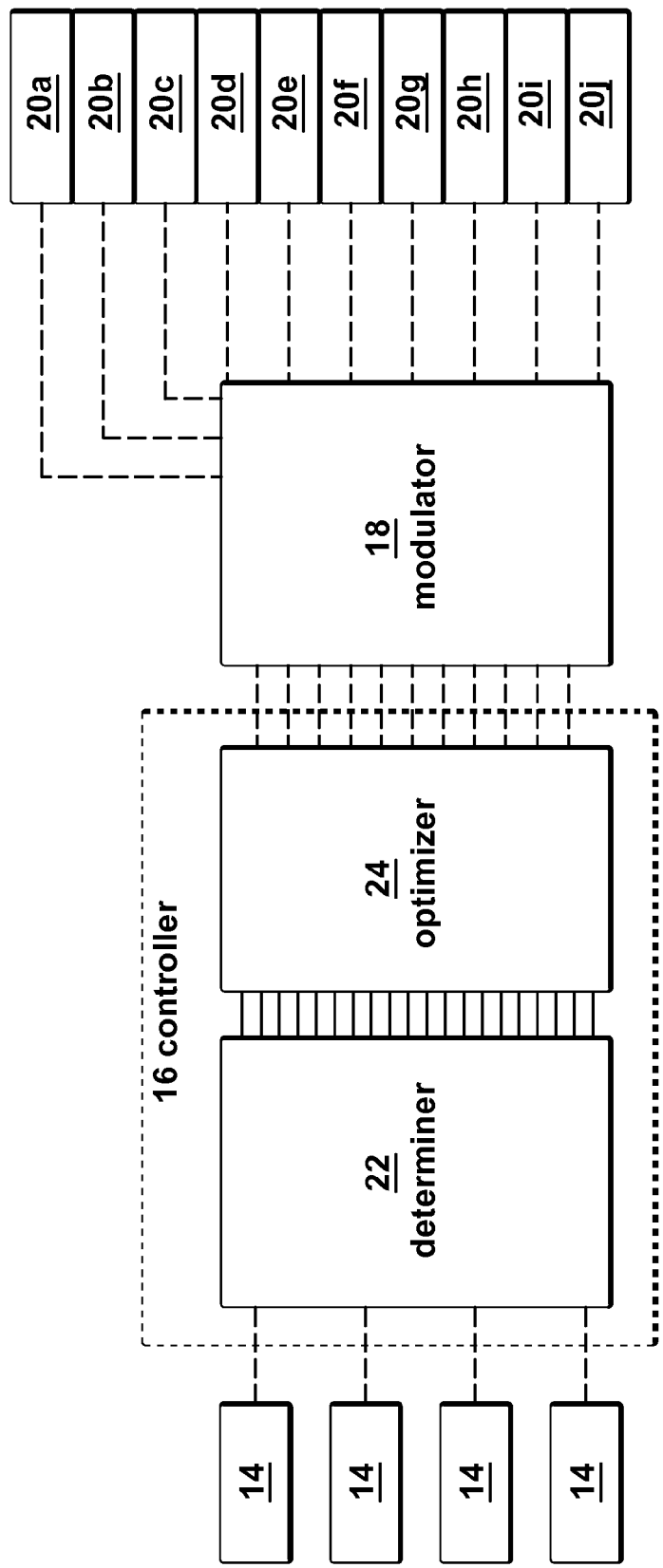
FIG. 2 is a diagram of the electric power system.

Referring now to the drawings, and initially to FIG. 1, an electric power system 10 is schematically shown installed on an aircraft 12. In the illustrated aircraft 12, engines 14 provide propulsive thrust and also electric power to a controller 16. The controller 16 is operably coupled to a modulator 18 which supplies electric power to a plurality of electrical devices 20a-20j. The electrical power can (but need not) be provided at a relatively constant voltage (e.g., 115 VAC, 230 VAC, etc.). As is seen by referring additionally to FIG. 2, the controller 16 comprises a determiner 22 and an optimizer 24.

The power system 10 and/or the aircraft 12 can include at least two electrical devices 20, at least three electrical devices 20, at least four electrical devices 20, at least five electrical devices 20, at least six electrical devices 20, at least eight electrical devices 20, at least ten electrical devices 20, and/or at least twenty electrical devices 20. At least some (and/or all) of the electrical devices 20 can comprise ice-protection devices mounted for, example, on leading edges, wings, engine nacelles, and/or windshield surfaces. The devices 20 can be located relatively adjacent to, and/or relatively remote from, each other on the aircraft 12.

The modulator 18 supplies electric power to each electric device 20 in a modulated manner for a plurality of increments summing into a time period. The increments can be, for example, less than 1 second, less than 0.5 second, less than 0.25 second, between 0.10 second and 0.20 second, and/or about 0.15 second. The time periods represent substantially longer windows than the increments, and they can be, for example, at least 5 seconds, and/or at least 10 seconds. Each time period can have at least four increments, at least ten increments, at least 15 increments, and/or at least nineteen increments.

Figure 3C:
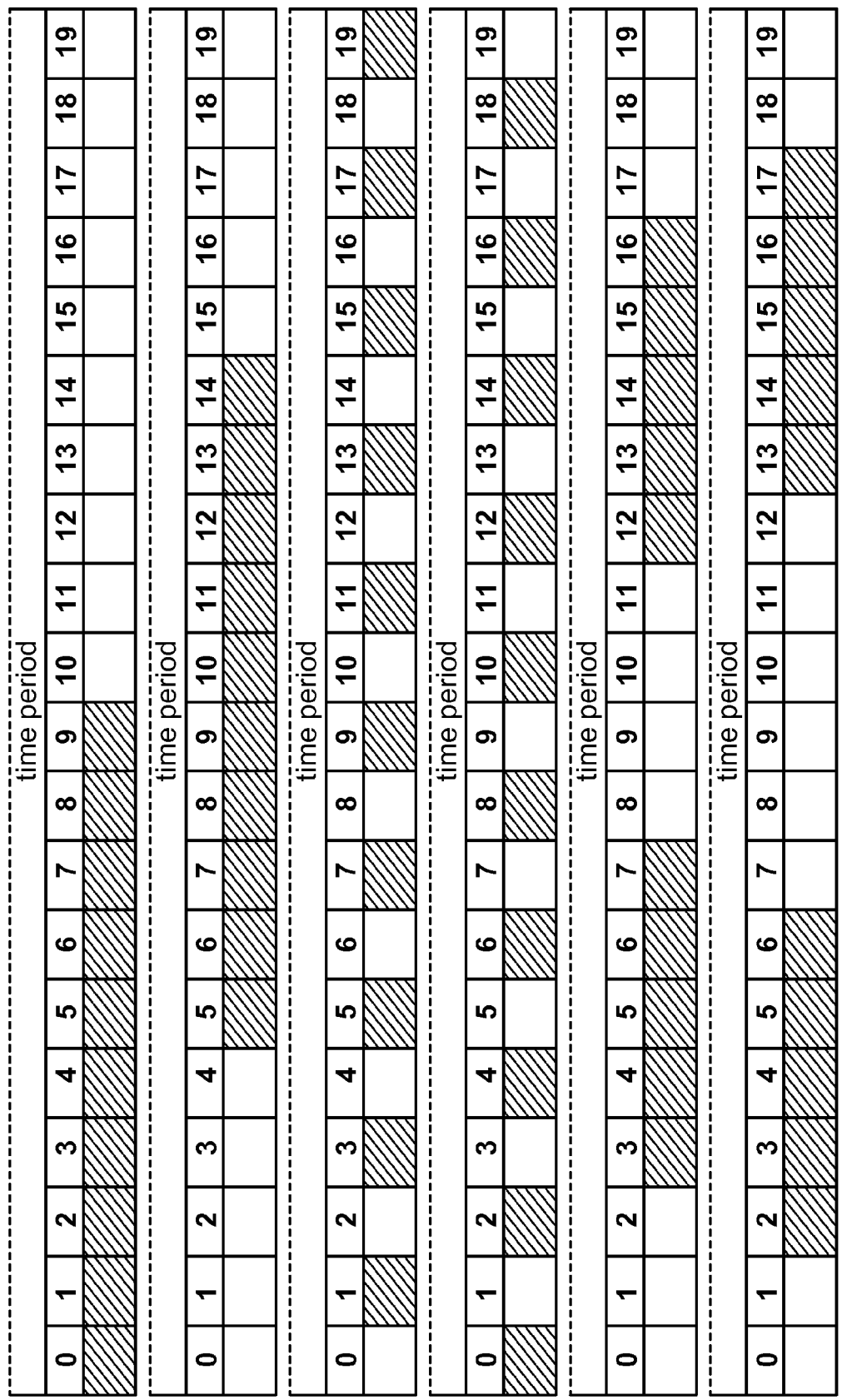
Figure 3D:
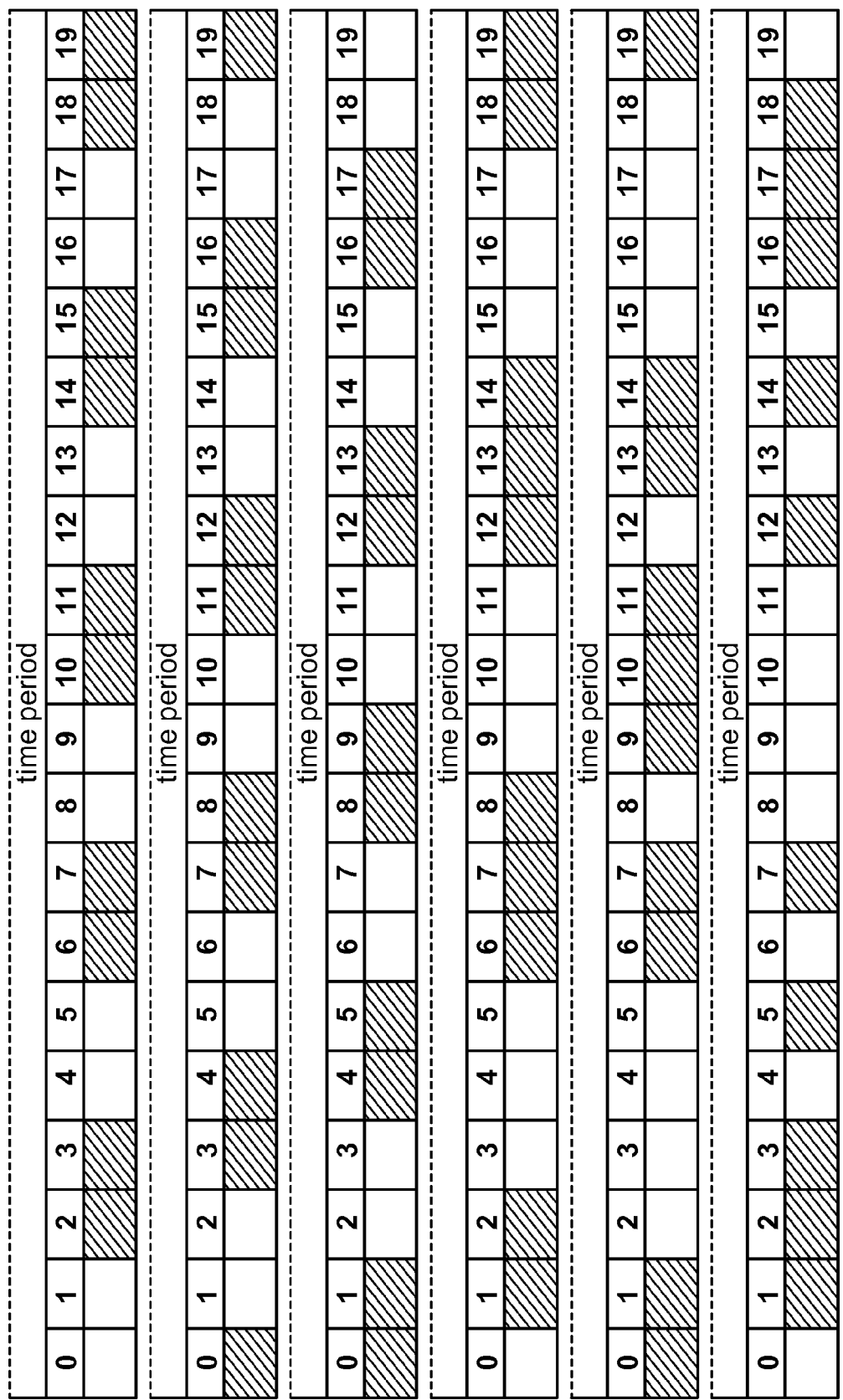
Figure 3E:
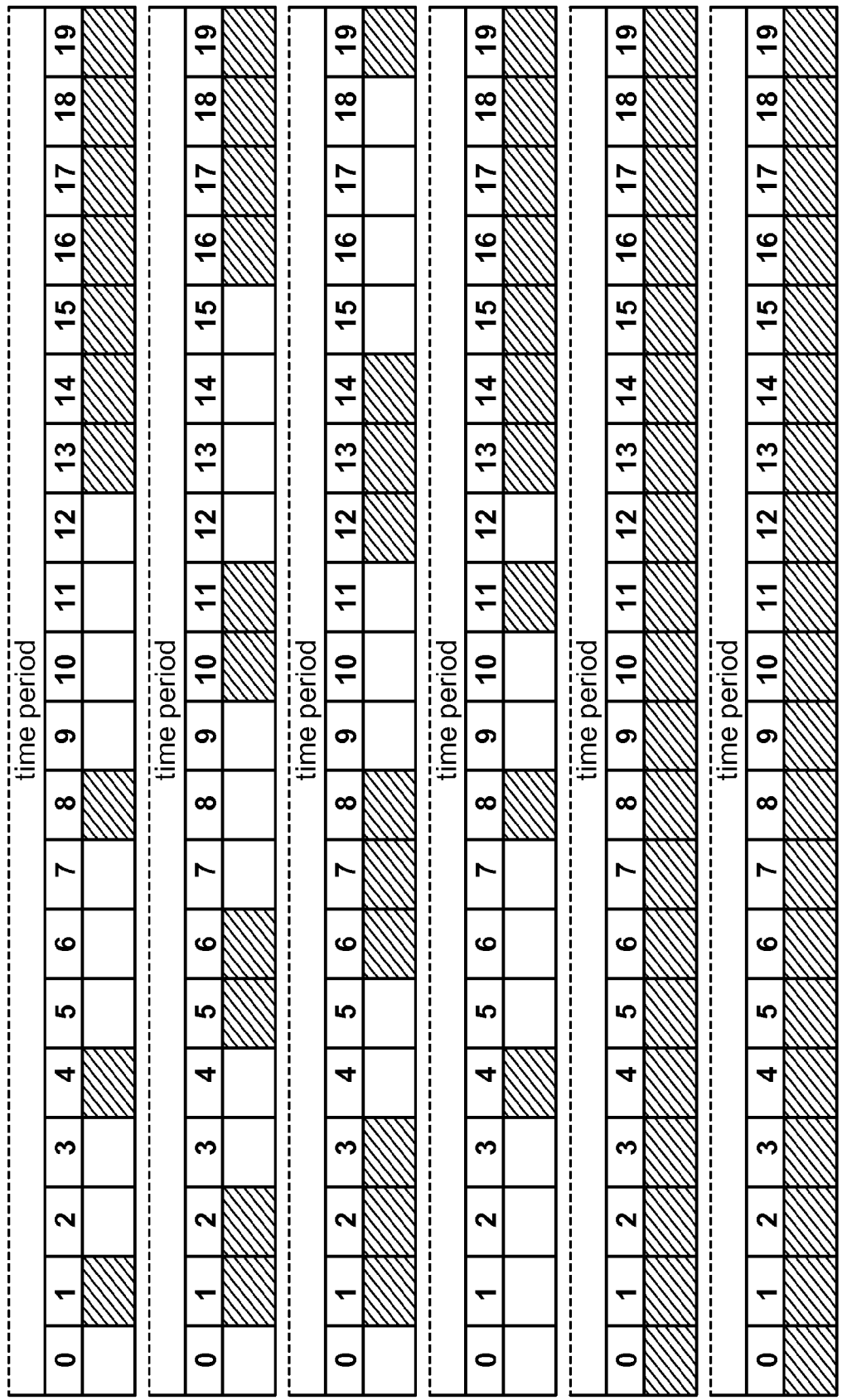

As shown schematically in FIG. 3A, for example, the time period can include twenty increments, and electric power can be supplied to the device 20 during ten of the twenty increments (i.e., 50% of the increments). The distribution of these ten increments creates the distribution pattern shown in FIG. 3B. And as is shown in FIG. 3C, there are numerous other distribution patterns that also correspond to the same increment percentage (e.g., 50%). A pattern of power modulation within a time period such as depicted in FIG. 3 may be temporally repeated as necessary to fulfill the purpose of the power application.

The controller's determiner 22 determines, for each electric device 20, an increment percentage representing the number increments during which the device 20 must receive electrical power to adequately perform in a present condition. The present condition can be detected, sensed, measured, input (e.g., by the pilot), and/or pre-programmed to trigger upon another event.

If the electric device 20 is a deicer or other ice protection unit, the relevant present condition can comprise a measured temperature. For example, at a relatively warm outside air temperature (OAT), a 25% increment percentage may be sufficient. At a moderately colder OAT, a 50% increment percentage may be sufficient. At still colder OAT's, a 75% increment percentage could suffice. Only in worst case situations (e.g., the lowest OAT an aircraft could ever possibly encounter) would a 100% increment percentage probably be necessary. The present condition could additionally or alternatively relate to other temperature conditions such as the surface temperature of a specific region of the relevant aircraft surface.

In the example shown in FIG. 3A and discussed in the preceding paragraphs, certain increment percentages (e.g., 25%, 50%, 75%, 100% etc.) are employed. But such parameters need not be limited to these or other preset percentages. In fact, the number of increment percentages is confined only by the number of increments available. If twenty increments are used, for example, percentages in 5% intervals (e.g., 5%, 10%, 15%, 20% . . . 95%, 100%) is possible and perhaps preferred.

The present condition can comprise non-temperature flight conditions. For example, an aircraft's icing vulnerability is affected by factors such as altitude, aircraft speed, angle of attack, flight phase (e.g., takeoff, climb, cruise, approach, landing, etc.), position of movable parts (e.g., ailerons, flaps, slats, spoilers, elevators, rudders, etc.), cloud characteristics, and/or liquid water content. The determiner can take these and other flight conditions into account when appraising deicer power requirements.

The present condition could also or instead comprise parameters stemming from details of the electrical device itself. For example, with resistance-heating elements (deicers or not), the power density achieved by a given voltage depends upon the elements' resistance. The determiner can take realtime resistance readings into consideration when ascertaining the increment percentage that each electrical device must receive in order for it to perform adequately its duties.

Resistance can vary among originally-installed electrical devices because of manufacturing tolerances. And this variance can be further complimented as original devices are removed and replacement devices installed. Damage during a flight (e.g., a bird strike) can further introduce resistance-adjustments into the equation. Moreover, resistance changes with temperature, so even with the most precisely manufactured devices, resistance characteristics can change during the course of a flight. On this latter point, the ability to adjust for resistance changes may allow the use of more economic resistance materials (e.g., copper) as a constant resistance is no longer essential to accurately estimate heating capacity.

The present condition could further include the voltage from the power source so as to compensate for unanticipated voltage fluctuations from the source.

Upon determination of the increment percentage for each electrical device 20, each device 20a-20j will have a plurality of suitable increment distribution patterns. These distributions patterns can be arrayed into a multitude of unique portfolios, all of which will meet the increment-percentage requirements of each individual device 20.

Figure 4A:
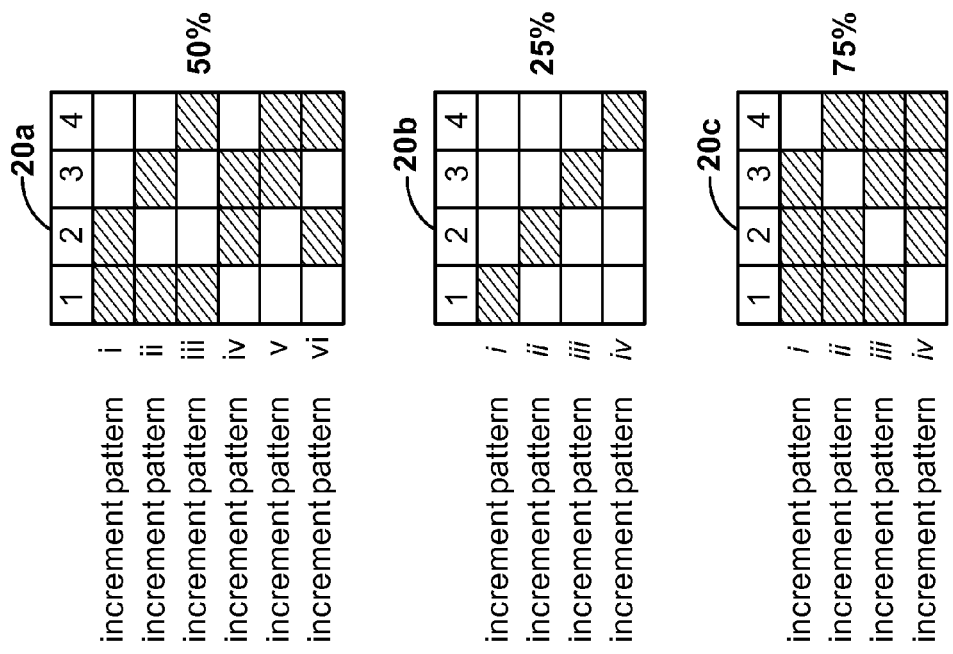
FIGS. 4A-4D show possible increment-distribution patterns and portfolios that can be created thereby.
Figure 4B:
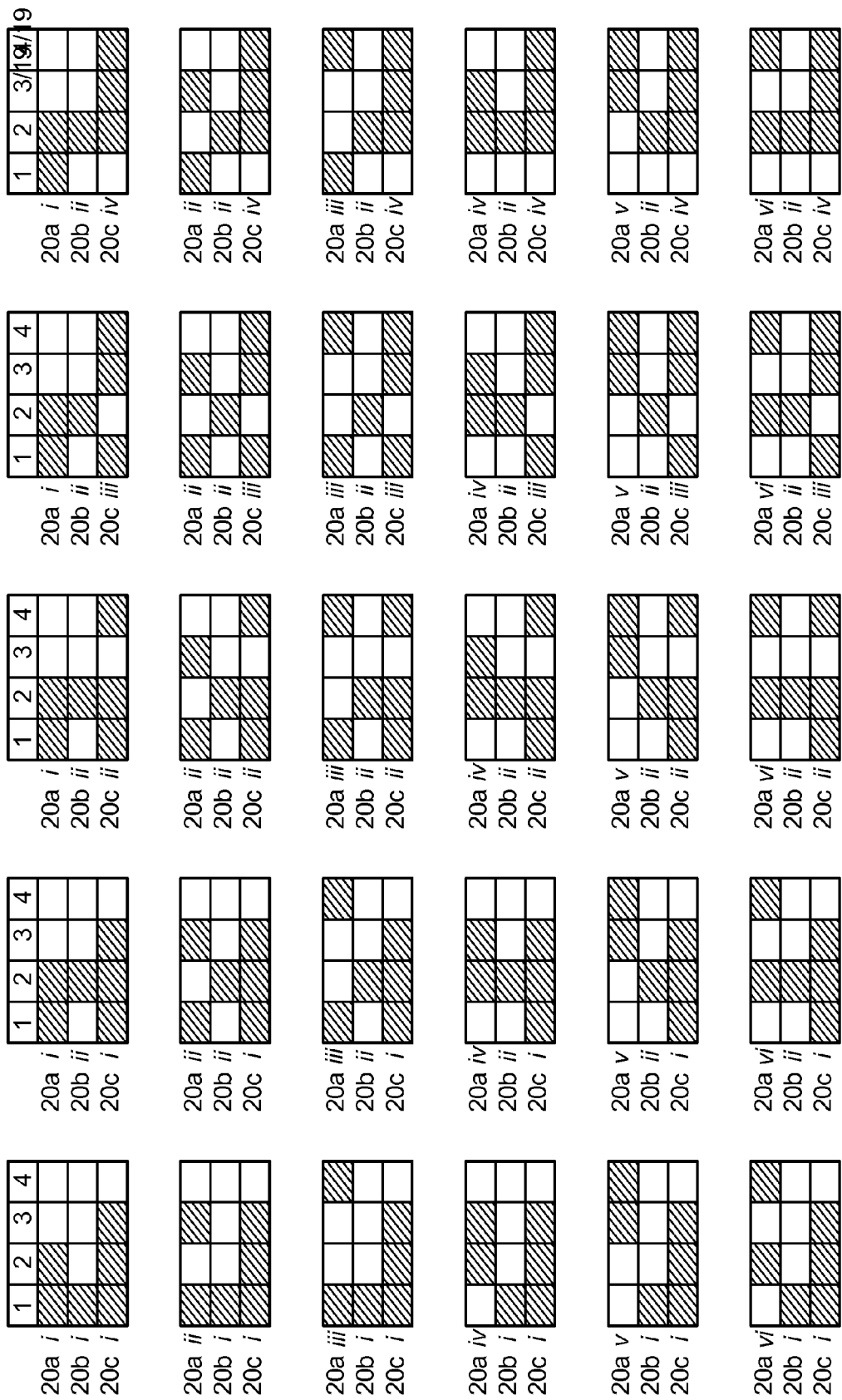
Figure 4C:
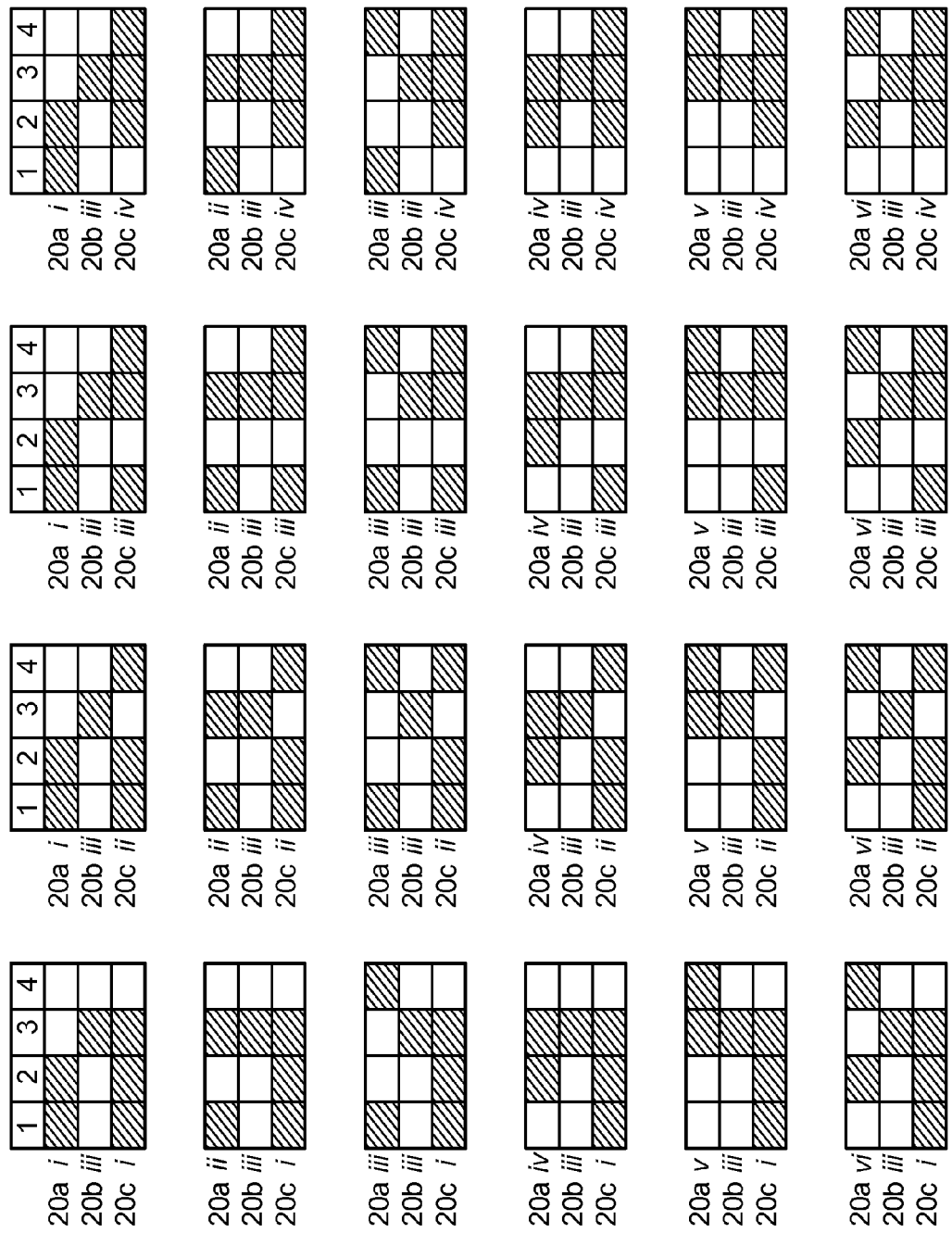
Figure 4D:
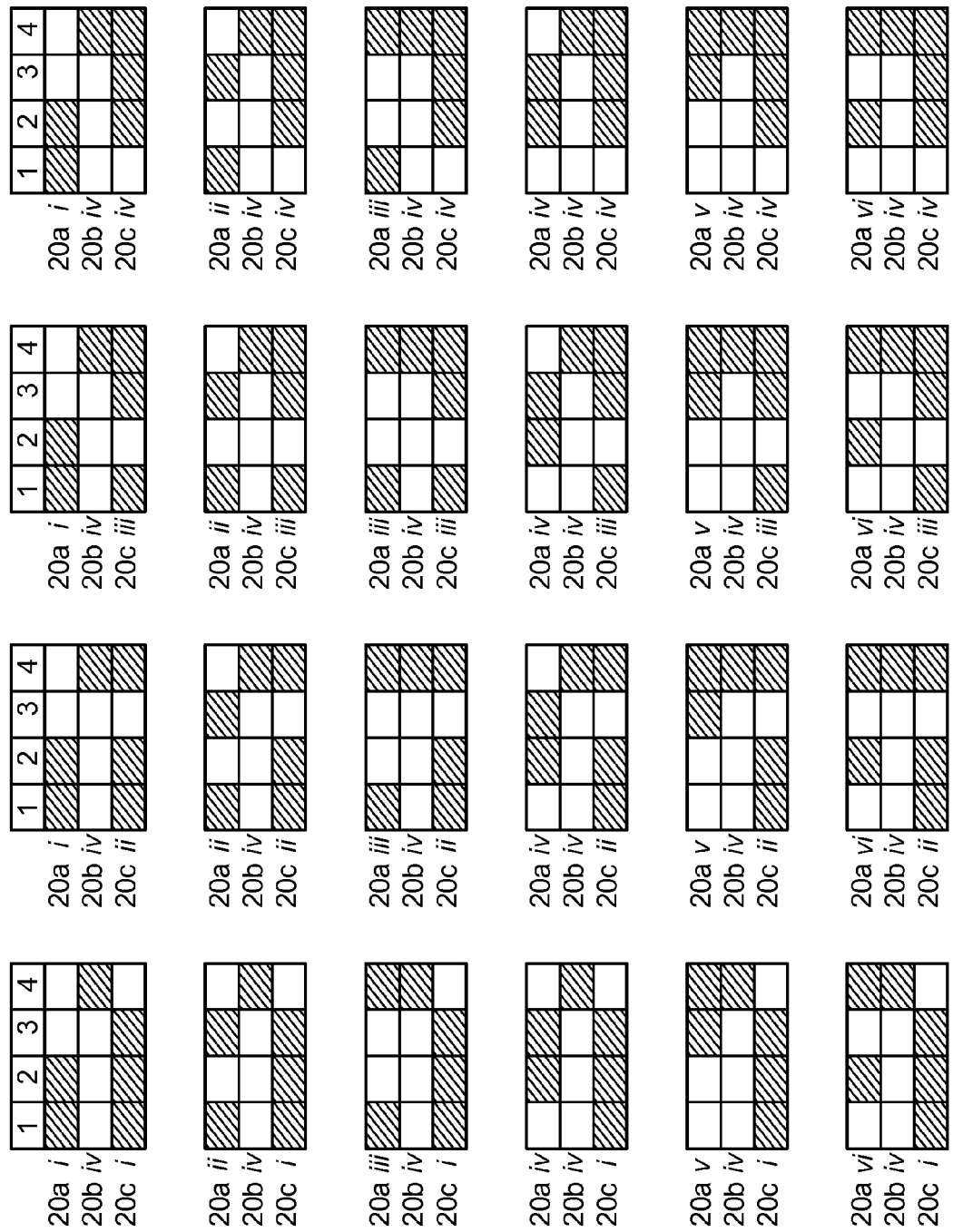

This portfolio concept is shown schematically in FIGS. 4A-4D, with only three devices 20a-20c and four increments, for ease of explanation. In this example, device 20a has a determined increment percentage of 50% (and six possible patterns i-vi), device 20b has a determined increment percentage of 25% (and four possible patterns i-iv), and device 20c has a determined incremental percentage of 75% (and four possible patterns i-iv). These different increment patterns can be used to create over ninety unique pattern portfolios, some of which are shown in FIGS. 4B-4D.

The controller's optimizer 24 selects, from the pattern portfolios, an optimum portfolio based on energy-management objectives. For example, if it is desirable for some reason that devices 20a and 20b not be provided power at the same time, only those portfolios satisfying this criteria could be considered. If the goal is to minimize electric power collectively supplied to the plurality of electric devices at each increment, the pattern portfolios could also be used for this purpose, with added information regarding their relative power consumptions. The optimum pattern portfolio could also or instead be established to minimize the variation in electric power collectively supplied between adjacent increments. Depending upon the circumstances and management objectives, several of the pattern portfolios could be appropriate or only a few (or one) would be sufficient.

Figure 5A:
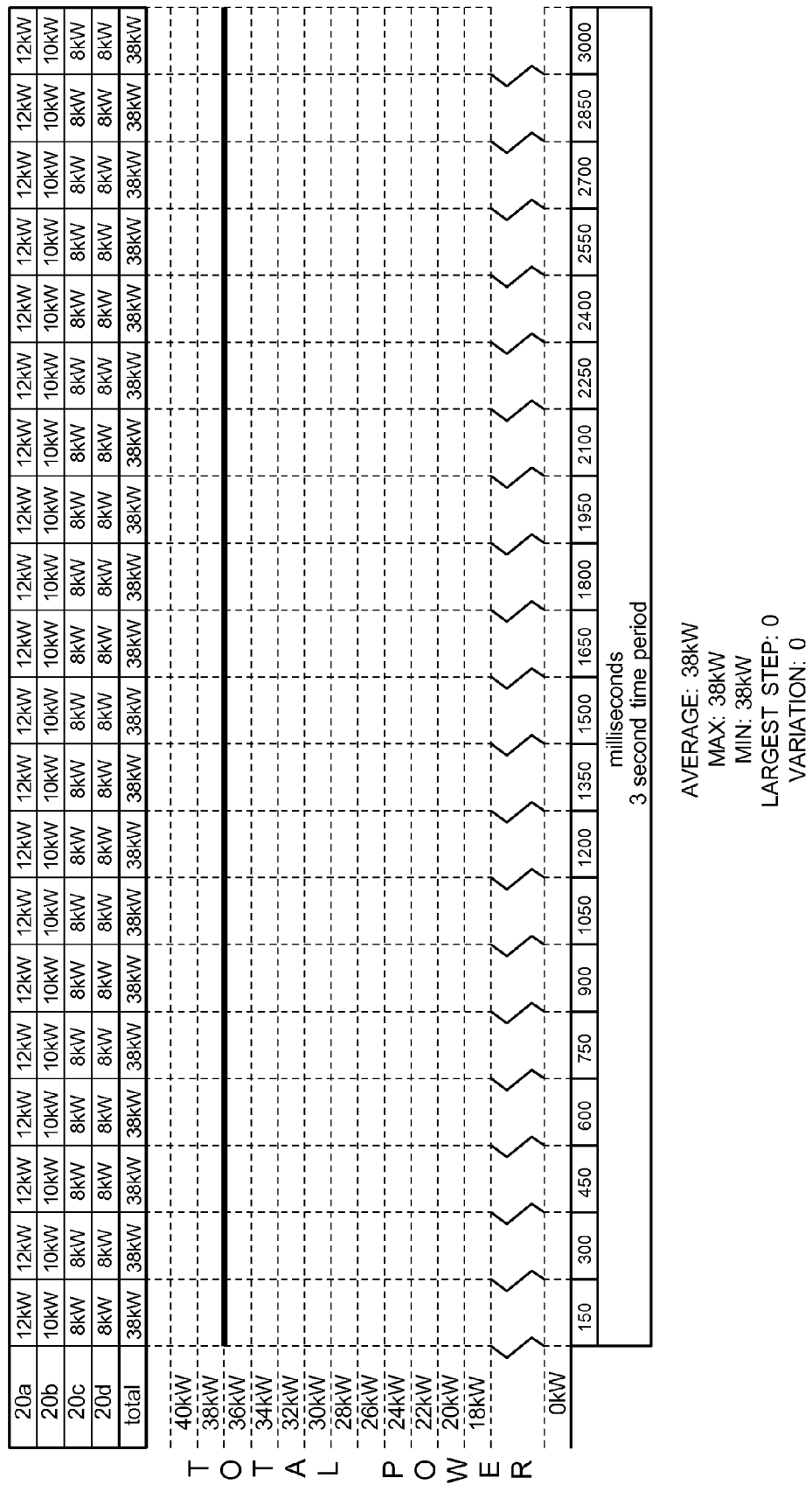
FIGS. 5A-5D are tables comparing different modulation portfolios.

In FIGS. 5A-5D, four of the electrical devices 20a-20d are shown. In FIG. 5A, the devices 20a-20d are each continuously supplied with electric power, resulting in a steady load of 38 kW. This is representative of a conventional system wherein an electrical device 20 continuously receives electric power when in an active state. For example, in an electric deicer that is cycled through active states (wherein the relevant surface is heated just enough to break the ice's boundary layer) and inactive states (wherein ice is allowed to accumulate on the relevant surface), electric power is continuously supplied to the deicer when in the active state.

Figure 5B:
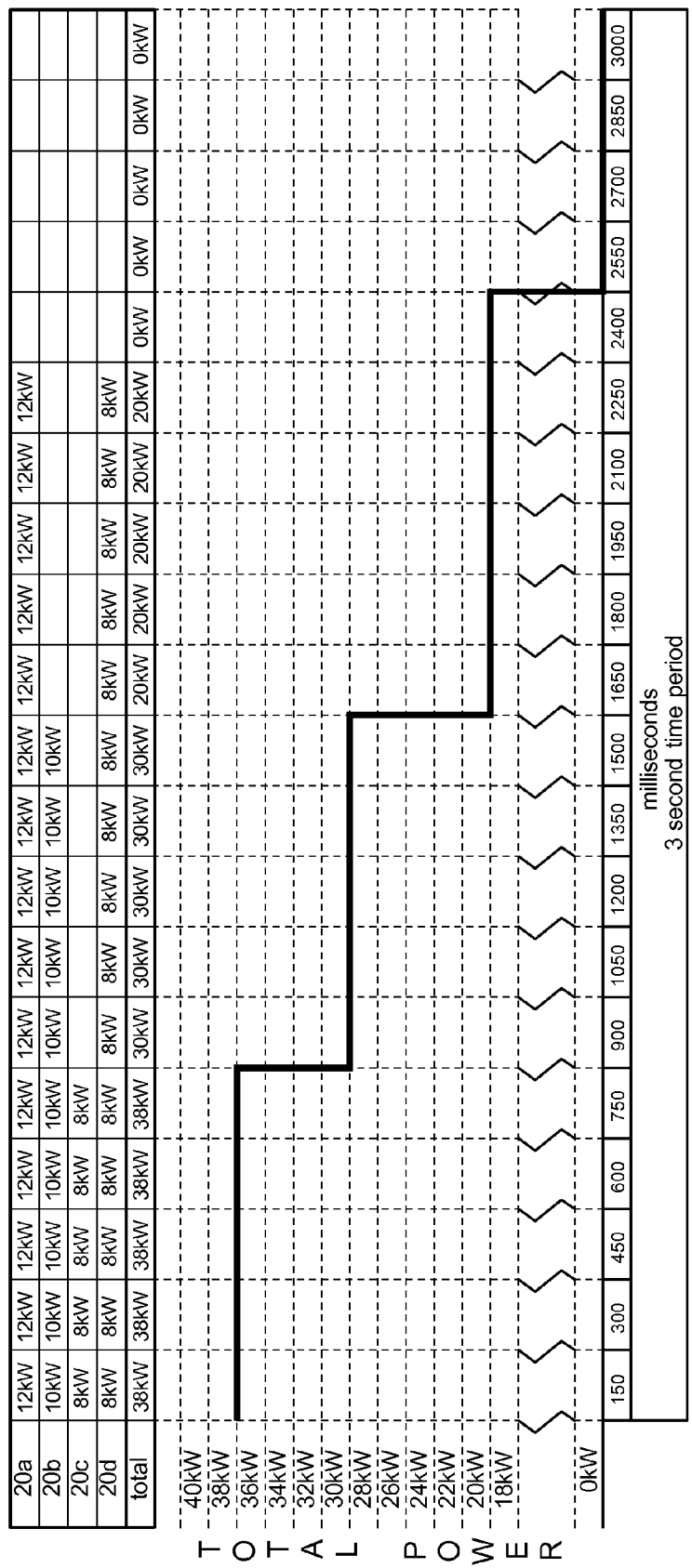
Figure 5C:
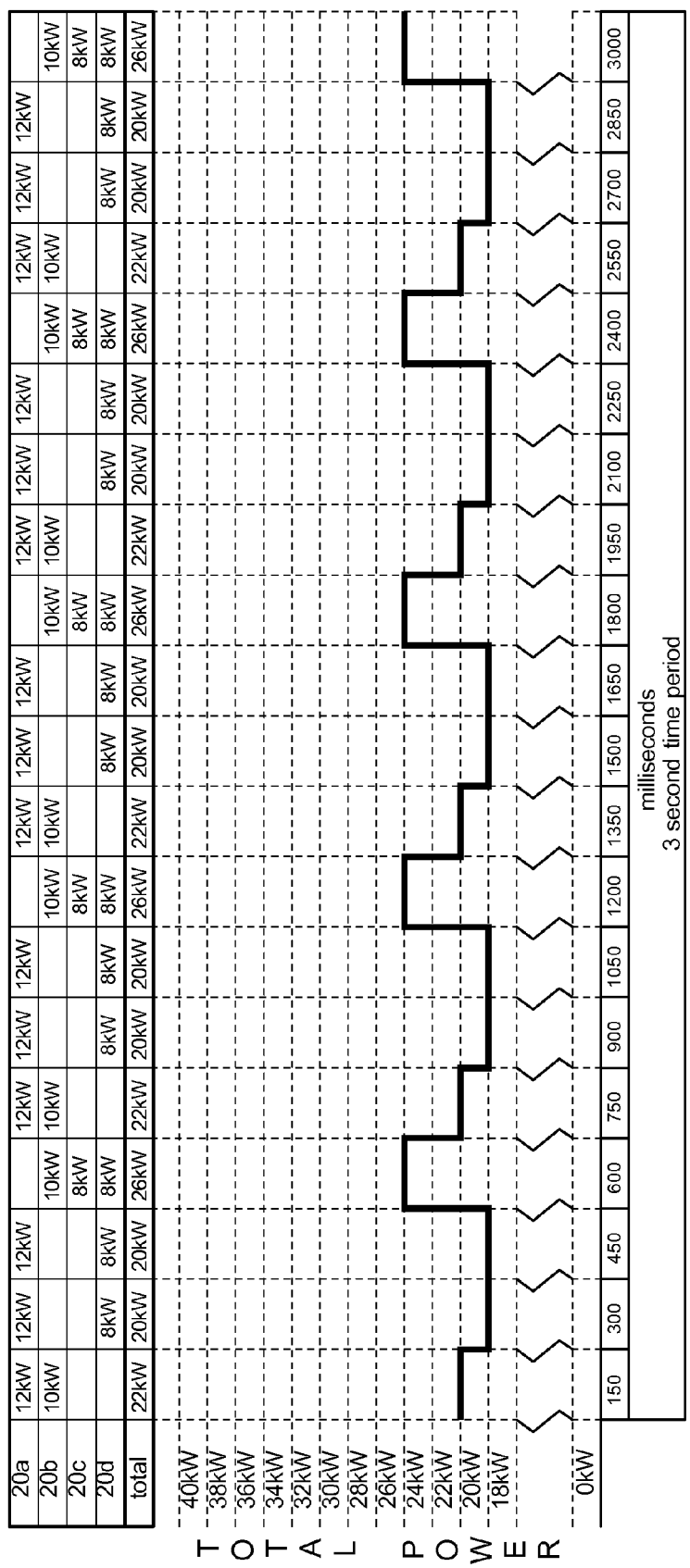
Figure 5D:
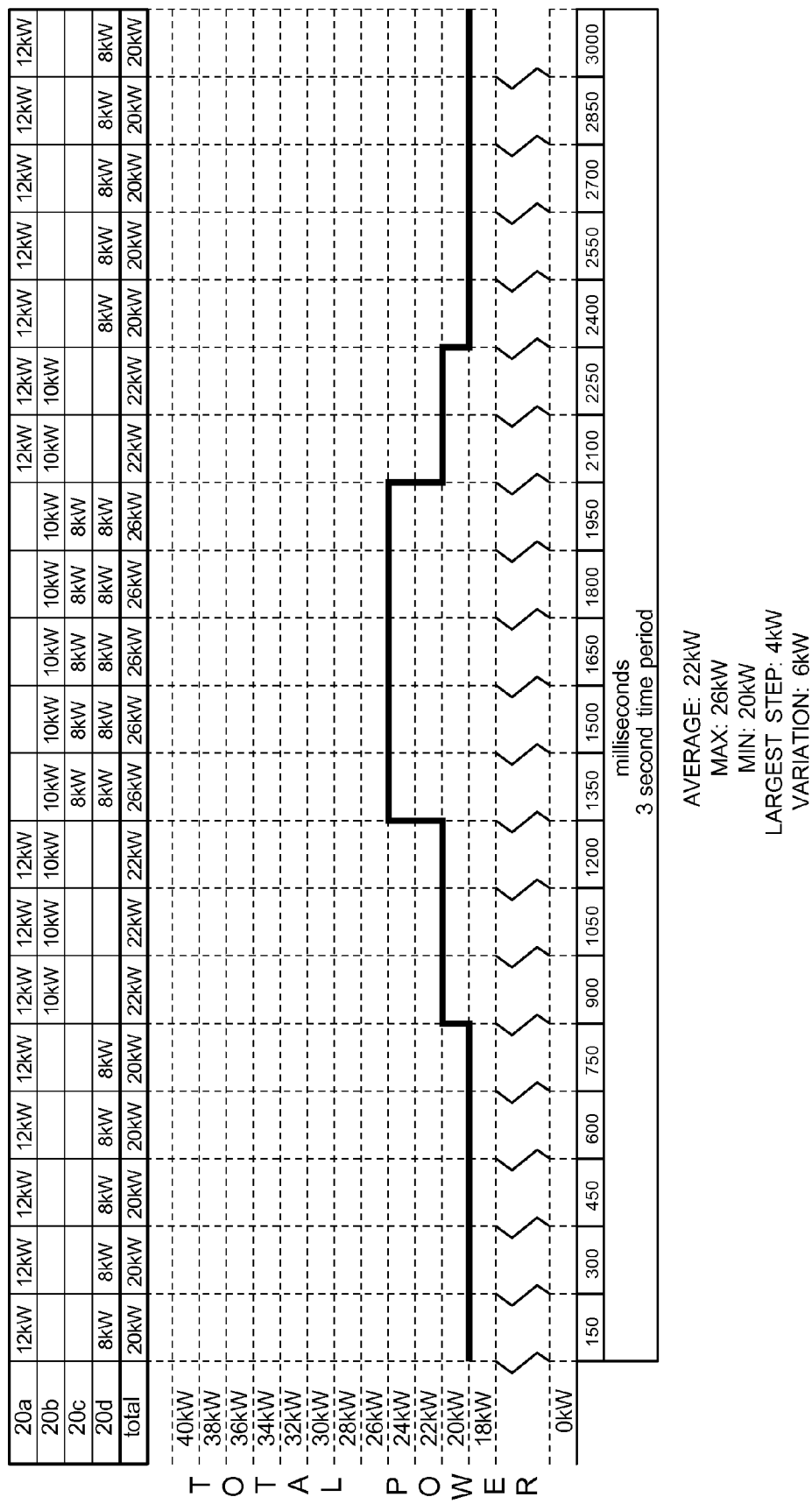

FIGS. 5B-5D are representative of the present system 10 wherein an increment-percentage determination is made for each electrical device 20. In this example, a 75% increment-percentage was determined for electric device 20a, a 50% increment-percentage was determined for electric device 20b, a 25% increment-percentage was determined for electric device 20c, and a 75% increment percentage was determined for electric device 20d.

In each of the portfolios shown in FIGS. 5B-5D, the average load is 22 kW, which is a significant power savings compared to the 38 kW power draw of FIG. 5A. In FIG. 5B, however, the variation between maximum load (38 kW) and minimum load (0 kW) is 38 kW. And the load drops from 38 kW to 30 kW (an 8 kW step), drops from 30 kW to 20 kW (a 10 kW step), and from 20 kW to 0 kW (a 20 kW step). Such a drastic variance in max-min load, and/or such big steps along the way, may not be desirable if large swings in power draw are discouraged during flight.

In FIGS. 5C-5D, the variation between the maximum load (26 kW) and the minimum load (20 kW) is 6 kW, a substantial reduction from that shown in FIG. 5B. In FIG. 5C, the largest step is 6 kW (when load jumps from 20 kW to 26 kW), a definite improvement over the 8 kW, 10 kW, and 20 kW steps that occur in the portfolio shown in FIG. 5B. In FIG. 5D, the "step" criteria is improved even further by a more refined portfolio wherein the largest step is 4 kW (when the load jumps/drops between 22 kW and 26 kW).

The optimum increment profile for each electrical device 20 can involve an in-flight analysis of each possible increment profile combination. Alternatively, this profile can be derived for stored data gathered during a pre-flight analysis of each possible increment combination. This analysis (in-flight and/or pre-flight) may comprises an algorithm, such as a software algorithm executed by, for example, a central processing unit.

As shown schematically in FIG. 6A-6M, a suitable algorithm can be developed to provide each electrical device 20 with the required power while minimizing the total power draw at any instance and allowing for a gradual rise/fall of the power draw.

The algorithm can be developed in the context of rows and columns in a theoretical table (and adapted to the appropriate programming language). In this table, the rows representing the electrical devices 20 and the columns represent the number of intervals in a time period. An additional row is provided on the table to store the totals of the respective columns. Initially, all of the rows contain a zero value. (FIG. 6A.)

The electrical devices 20 are initially arranged in an order of descending power draw. In the example of FIG. 5, this arrangement results in a sequence of device 20a (12 kW), device 20b (10 kW), device 20c (8 kW), and device 20d (8 kW). The a-b-c-d order of the electrical devices 20 is a coincidence in this situation, other more random orders could and would occur.

For the first electrical device 20a, the 75% increment-percentage is transferred to the table by filling in the 75% of the leftmost cells with the corresponding power draw (12 kW)

and the total power draw from each column is computed. (FIG. 6B.) The columns are then sorted in ascending values from left to right. (FIG. 6C.)

For the second electrical device 20b, the 50% increment-percentage and corresponding draw (10 kW) are added (FIG. 6D) and then the columns sorted in ascending order (FIG. 6E). This process is repeated for the third electrical device 20c (25% increment-percentage and 8 kW power draw) and the fourth electrical device 20d (75% increment-percentage and 8 kW power draw), as shown in FIGS. 6F-6I.

The table is then decimated in two tables with the first table (FIG. 6J) containing the odd columns (1, 3, 5, ... 19) and the second table (FIG. 6K) containing the even columns (2, 4, 6, ... 20). The column are reversed in the second table so that they are now arranged in a descending order (FIG. 6L). The two tables are then concatenated into the final table by inserting the reversed second table to the right of the first table (FIG. 6M).

One may now appreciate that the electrical power system 10 not only reduces overall power consumption of the devices 20, but also enhances energy management of the aircraft 12. Although the system 10, the aircraft 12, associated methods and/or related elements/steps have been shown and described with respect to certain embodiments, equivalent and obvious alterations and modifications, including applications not related to aircraft, will occur to others skilled in the art upon reading and understanding of this specification.

The invention claimed is:

1. A method of providing electric power to a plurality of electrical devices over a plurality of increments summing into a predetermined time period, said method comprising:
   determining, for each electrical device, a percentage of the plurality of increments that the electrical device must receive electric power for it to adequately perform in a present condition;
   establishing an optimum increment-pattern portfolio for the time period, the optimum pattern portfolio comprising an incremental distribution pattern for each electrical device that corresponds to its determined increment-percentage; and
   supplying electric power via modulation to the plurality of electrical devices over the plurality of increments summing into the predetermined time period, wherein for each increment, each electric device is either supplied electric power or it is not supplied electric power;
   wherein said modulation-supplying step is performed in accordance with the established optimum increment-pattern portfolio.

2. A method as set forth in claim 1, wherein said optimum-pattern-portfolio establishing step establishes the optimum pattern portfolio so as to minimize the electric power collectively supplied to the plurality of electric devices at each increment.

3. A method as set forth in claim 2, wherein said optimum-pattern-portfolio step is performed so as to minimize the variation in the electric power collectively supplied to the plurality of electric devices between adjacent increments.

4. A method as set forth in claim 1, wherein said optimum-pattern-portfolio step is performed so as to minimize the variation in the electric power collectively supplied to the plurality of electric devices between adjacent increments.

5. A method as set forth in claim 1, wherein voltage is not directly reduced for supply to electric devices.

6. A method as set forth in claim 1, wherein the time period is at least 5 seconds.

7. A method as set forth in claim 6, wherein the increments are less than 1 second.

8. A method as set forth in claim 1, wherein each time period has at least ten increments.

9. A method as set forth in claim 1, wherein the plurality of electric devices comprises at least four electrical devices.

10. A method as set forth in claim 9, wherein the electrical devices comprise electrothermal ice protectors.

11. A method as set forth in claim 1, wherein the present condition comprises a sensed or measured condition, an input condition, and/or a programmed condition.

12. A method as set forth in claim 1, wherein the present condition comprises ice-formation information, an outside air temperature, now-being-supplied voltage, and/or resistances of the electrical devices.

13. An electric power system for performing the method of claim 1, said system comprising:
   a modulator that supplies electric power to the plurality of electrical devices in accordance with the optimum increment-pattern portfolio;
   an increment-percentage determiner that determines, for each electrical device, the percentage of the plurality of increments that the electrical device must receive electric power for it to adequately perform in the present condition; and
   an optimizer that establishes the optimum pattern portfolio for the time period.

14. A vehicle comprising a plurality of electrical devices adapted to operate when supplied with electric power, and the electrical power system set forth in claim 13.

15. A vehicle as set forth in claim 14, further comprising an onboard power source supplying electrical power to the plurality of electrical devices.

16. A vehicle as set forth in claim 15, further comprising an engine and wherein the onboard power source comprises an electrical generator rotated by the engine.

17. A vehicle as set forth in claim 14, wherein the vehicle is an aircraft.

18. An aircraft as set forth in claim 17, wherein the electrical devices comprise electrothermal ice-protection devices.

19. An aircraft as set forth in claim 18, wherein at least some of the ice-protection devices are located remote from each other.

* * * * *